United States Patent [19]

Hoffmann et al.

[11] Patent Number: 5,000,585
[45] Date of Patent: Mar. 19, 1991

[54] APPARATUS FOR BEARING A SHAFT

[75] Inventors: Dieter Hoffmann, Buchs; Thomas Scholian, Rombach, both of Switzerland

[73] Assignee: Kern & Co. Ltd., Aarau, Switzerland

[21] Appl. No.: 438,308

[22] Filed: Nov. 20, 1989

[30] Foreign Application Priority Data

Nov. 18, 1988 [CH] Switzerland .................... 04281/88

[51] Int. Cl.⁵ .................. F16C 17/00; F16C 23/02; G01C 1/02
[52] U.S. Cl. .................................. 384/129; 33/281; 384/247; 384/259
[58] Field of Search ............... 384/129, 247, 252, 253, 384/257-259, 519, 583; 33/281, 290

[56] References Cited

U.S. PATENT DOCUMENTS

| | | | |
|---|---|---|---|
| 2,408,995 | 10/1946 | Osplack | 384/519 |
| 2,639,199 | 5/1953 | Patrosio | 384/247 |
| 3,433,571 | 3/1969 | Brunson | 33/290 |
| 3,557,458 | 1/1971 | Shults | 33/281 |
| 4,093,383 | 6/1978 | Feist et al. | 33/281 X |

*Primary Examiner*—Thomas R. Hannon
*Attorney, Agent, or Firm*—Burns, Doane, Swecker & Mathis

[57] ABSTRACT

A shaft is borne in a standard by an intermediate member and a supporting bearing so that the shaft may follow without constraint lateral shifts of the supporting bearing by tilts about a plurality of small angles located in different planes. This effect is achieved by providing one of two guiding rings for the shaft within the intermediate member with two small sliding projections. These projections may be vertically arranged on a diameter of the intermediate member, which in turn is mounted to the standard by two small seat-engaging surfaces which are horizontally arranged on a diameter of the intermediate member. The apparatus is preferably used with shaft angle encoders for theodolites.

10 Claims, 5 Drawing Sheets

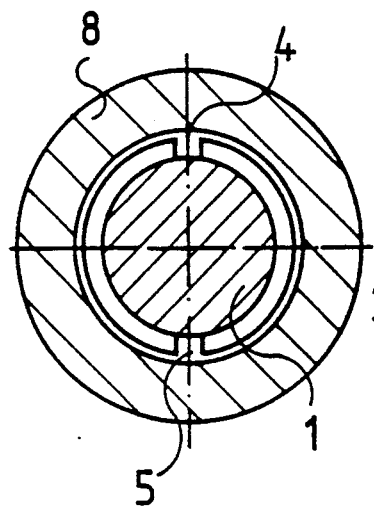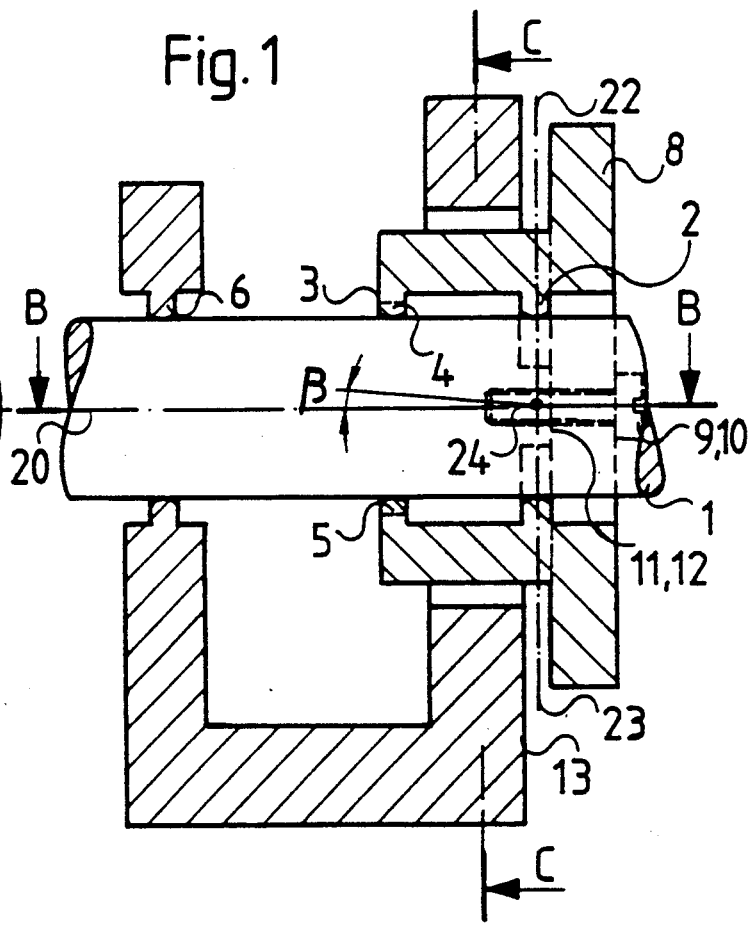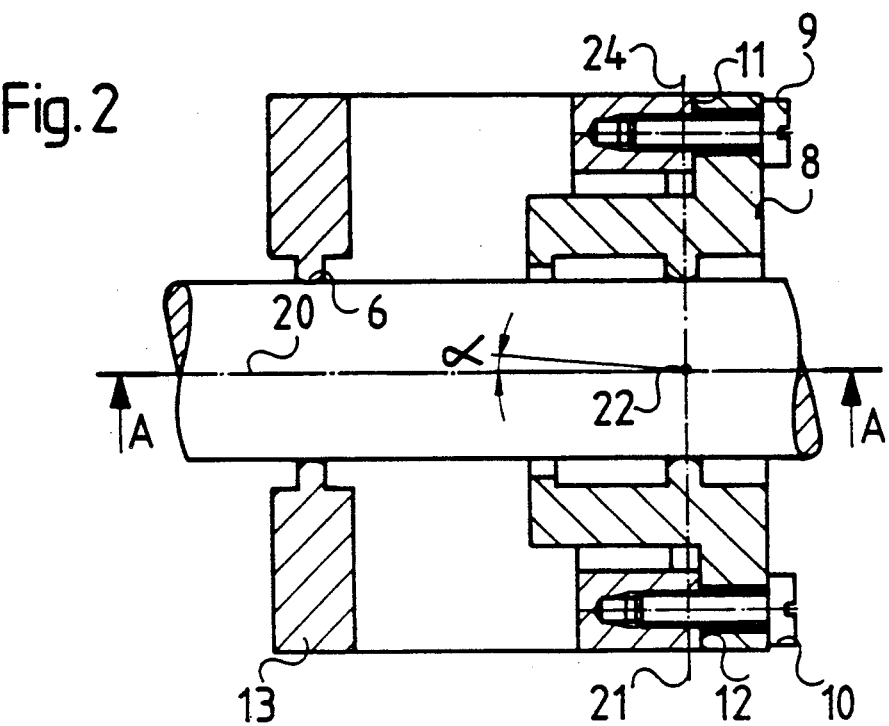

5,000,585

APPARATUS FOR BEARING A SHAFT

FIELD AND BACKGROUND OF THE INVENTION

This invention relates to an apparatus for bearing a shaft in a standard comprising a main bearing and a supporting bearing. It is concerned more particularly with theodolites for surveying purposes and with the telescope supports therein.

Theodolites for surveying purposes typically include a base and an upper portion that includes a reasonably rigid standard for the movable support of a telescope. The telescope is attached to a shaft mounted in the standard by a main bearing at one end portion of the shaft and a supporting bearing at the opposite end portion of the shaft. The shaft is usually guided in the main bearing radially as well as in axial direction.

As usually constructed, the shaft mountings for such theodolites have little capability for positional shifts of the supporting bearing such as may occur for example due to mechanical stress equalization or thermal expansion.

This limitation in the capabilities of the shaft mountings has in turn tended to lead manufacturers to use expensive and time consuming procedures for assembly and adjusting the theodolites. Yet such disadvantages have been tolerated as necessary to the maintenance of the desired accuracy in the measurements to be made by the completed theodolite.

SUMMARY OF THE INVENTION

In one of its aspects the present invention provides for the mounting of a theodolite (or other precision instrument) shaft in a manner such that small tilting motions of the shaft in different directions will be possible.

The present invention provides an apparatus for bearing a shaft in a standard comprising a main bearing and a supporting bearing, wherein the shaft is borne within the main bearing by means of an intermediate member having at least two guiding means for the shaft with an axial separation between said guiding means, the intermediate member is joined to the standard in such a way that it can be tilted with respect to the standard about a first axis at right angles to the axis of the shaft by an amount substantially greater than tilting of the intermediate member is possible about a second axis at right angles to said first axis and to the axis of the shaft, and wherein said two guiding means for the shaft are designed to allow the shaft to be tilted with respect to the intermediate member about a third axis parallel to said second axis by an amount substantially greater than tilting of the shaft is possible with respect to the intermediate member about a fourth axis parallel to said first axis.

The intermediate member advantageously is joined to the standard by means of fastening elements and by seat-engaging surfaces of sufficiently small extent which are provided diametrically on said first axis at right angles to the axis of the shaft.

With this construction, the intermediate member may tilt slightly in one direction (preferably vertical tilting about a horizontal axis) to give the shaft mounting one degree of limited freedom to accommodate dimensional changes. Moreover, the shaft may tilt slightly relative to the intermediate member in a transverse direction (preferably horizontal tilting about a vertical axis) to give the shaft mounting a second degree of limited freedom to accommodate dimensional changes.

In a preferred form of the invention, provisions also are made to prevent limited tilting of the shaft relative to the theodolite frame or "standard" from affecting materially the readings obtainable with respect to the vertical angle of the telescope carried by the shaft. Accurate readings of this type are of course essential to the satisfactory use of the theodolite in surveying work.

The sensing of the vertical angle of the telescope involves a disc having generally radial markings spaced apart from one another around a peripheral portion thereof. The disc is fixed to an end of the shaft carrying the telescope. A reader for these markings is located vertically above the axis of the shaft and is connected to the intermediate member of the shaft bearing at a point vertically above the axis of the shaft. This arrangement minimizes the effects of shaft shifting upon the relationship between the angle markings and the reader.

BRIEF DESCRIPTION OF THE DRAWINGS

These objects and many other advantages of the present invention will be readily apparent to one skilled in the pertinent art from the following detailed description of the preferred embodiments thereof as described in conjunction with the drawings, wherein:

FIG. 1 is a vertical central section of a bearing of a shaft according to the present invention as well as a corresponding standard along a line marked A—A in FIG. 2;

FIG. 2 is a horizontal cross section of the bearing as shown in FIG. 1 along a line marked B—B in FIG. 1;

FIG. 3 is a cross section of the bearing as shown in FIG. 1 along a line marked C—C in FIG. 1;

DETAILED DESCRIPTION OF THE PREFERRED EMBODIMENTS

Figure 7:
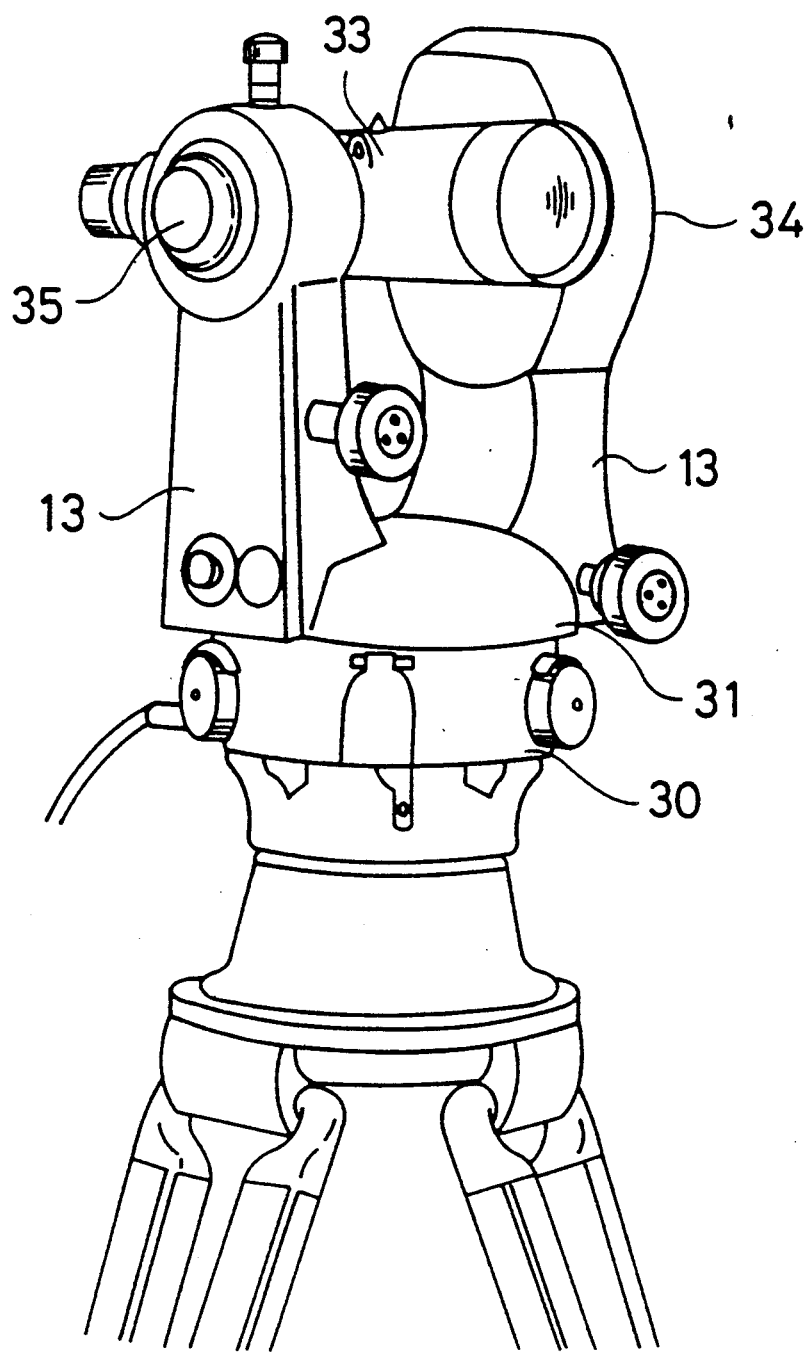
FIG. 7 is a view of a theodolite which may embody the present invention.
Figure 8:
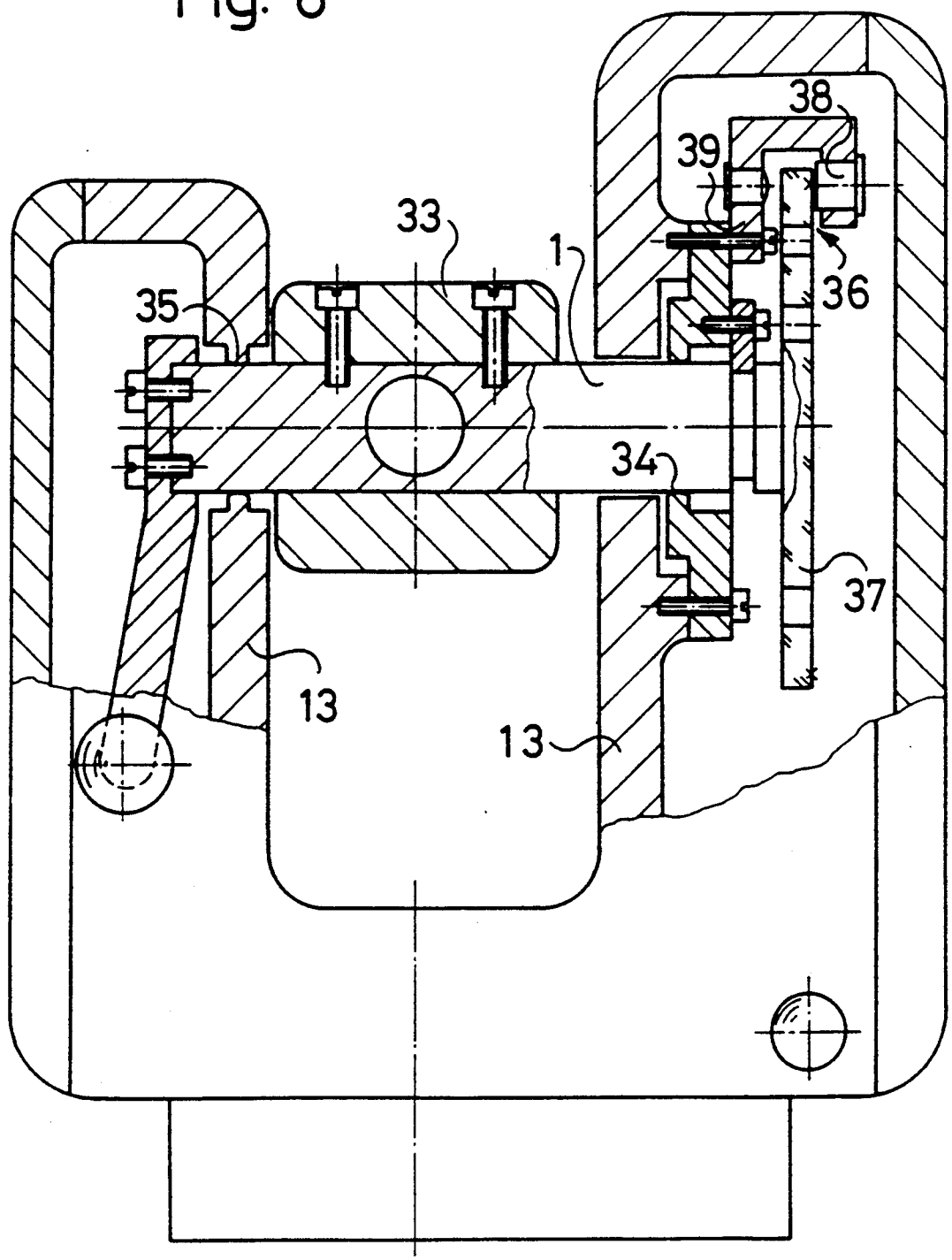
FIG. 8 is a central section of a shaft bearing the telescope of a theodolite as known in the state of the art.

It will be helpful to refer first to FIG. 7 which illustrates generally a theodolite for surveying purposes, and to FIG. 8 which shows a known type of telescope shaft mount in a theodolite. Theodolites usually have a base 30 and an upper portion 31, the upper portion comprising a standard 13 and a telescope 33 borne in the standard 13 by a shaft 1 (FIG. 8) in a main bearing 34 and a supporting bearing 35. The theodolite further comprises encoder means for measuring the horizontal direction and the elevation angle of the telescope 33, the encoder 36 for the elevation angle only being shown in FIG. 8. The shaft 1 is usually guided in the main bearing 34 radially as well as in axial direction.

In designing shaft-angle encoders 36 for measuring instruments such as theodolites, the angle sensor is provided as close as possible to the main bearing 34 to reduce measurement errors. The angle sensor comprises a divided circle 37 with a line-division mounted to the shaft 1 and a reading unit having a scanner plate 38 which is mounted to a bearing flange 39 of the main bearing 34. In order to achieve a high accuracy of measurement, the separation between scanner plate 38 and divided circle 37 in the direction of the shaft 1 axis should be made as small as possible and maintained sufficiently constant, e.g. 0.04 mm plus or minus 0.01 mm. These factors have lead to theodolite manufacturing procedures in use heretofore in which the shaft bearing, including main bearing 34 and supporting bearing 35 is mounted to a standard 13 of sufficient stability, and the seatengaging surfaces of the main bearing and supporting bearing are worked to a sufficient precision. According to this known method, the bearings are then mounted, which implies adjusting the angle sensor 38 to the required narrow separations for each new mounting.

Because of the accuracy required for such angle reading devices and because a plurality of high accuracy shaft mountings ordinarily are required in theodolites, the known theodolite fabrication techniques have resulted in high costs.

Figure 9:
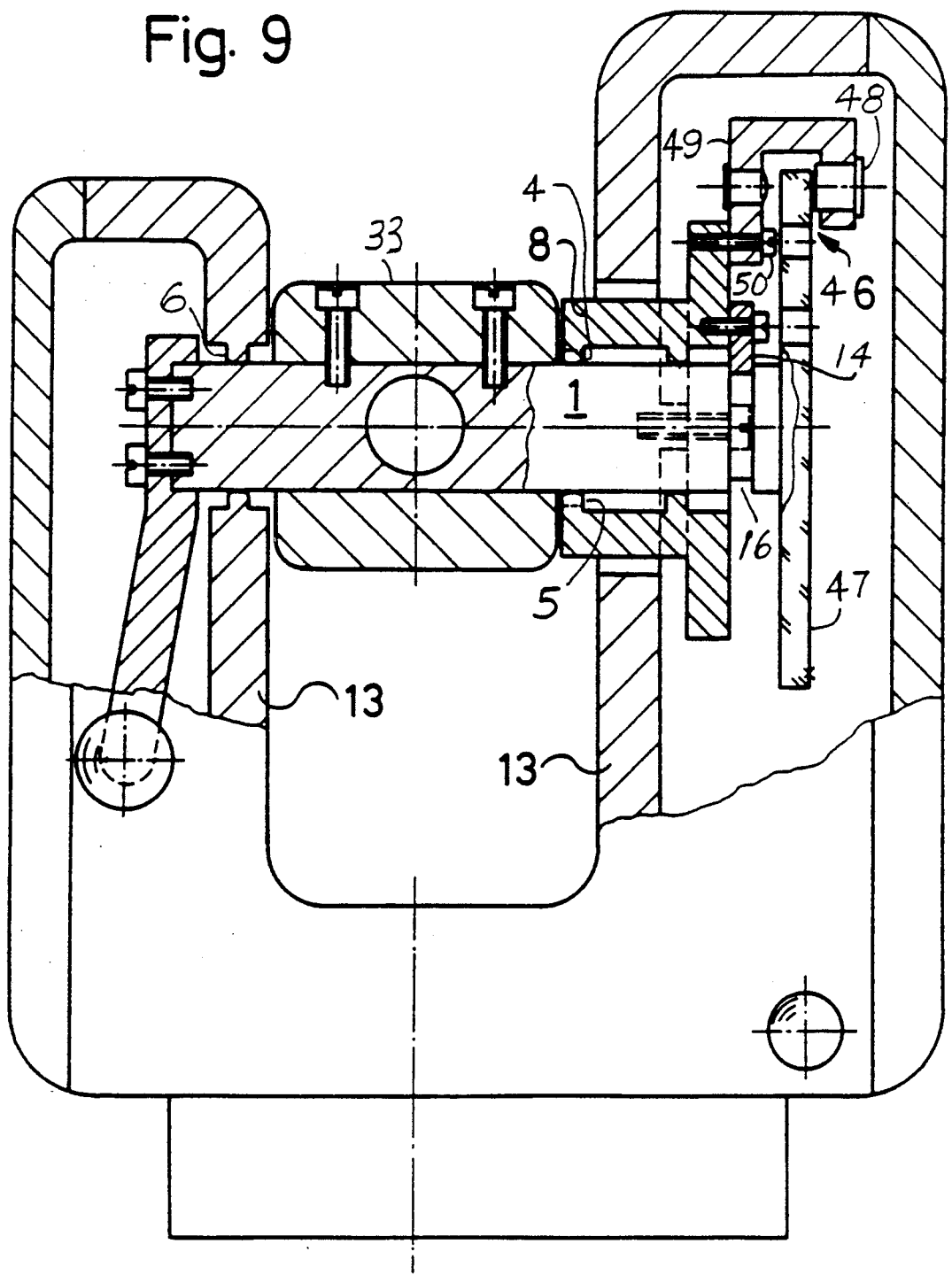
FIG. 9 is a central section of a shaft bearing the telescope of a theodolite according to the present invention.

FIG. 9 illustrates the present invention in a manner to contrast with FIG. 8, and it will be helpful to consider FIG. 9 with reference to FIG. 1. FIG. 1 is a view along the same plane as FIG. 9 but it does not show all of the theodolite components depicted in FIG. 9.

Referring to FIG. 1, a shaft 1 having an axis marked 20 in FIG. 1 and FIG. 2 is carried in a standard 13 by an intermediate member 8. The standard 13 may be comprised in a theodolite having a base 30 and an upper portion 31 as shown in FIG. 7. The upper portion comprises the standard 13 and a telescope 33 borne in the standard by the shaft 1 in a main bearing and a supporting bearing, as shown in FIG. 9. The theodolite further comprises encoder means 36 for measuring the elevation angle of the telescope 33.

The shaft 1 is radially guided around its complete circumference within a first guiding means 2 of the intermediate member 8. The guiding means 2 being a sliding bearing, a second guiding means 3 of the intermediate member 8 for the shaft 1 guides the shaft 1 merely from above and from below by means of two diametrically provided projections 4 and 5. The first and second guiding means 2 and 3 thus form a main bearing for the shaft 1 within the intermediate member 8. The intermediate member 8 is joined to the standard 13 by means of two screws 9 and 10 and by two small seat-engaging surfaces 11 and 12 of the standard 13 as shown in FIG. 2. Thus, the intermediate member 8 may follow without constraint in case of small tilts of typically 0.3 degrees of the shaft 1 through an angle marked beta about an axis 21 better shown in FIG. 2.

The seat-engaging surfaces 11 and 12 of the standard 13 are positioned on the axis 21 at a considerable distance from the central axis 20 of the shaft 1. This is why the intermediate member 8 is rather stiffly fixed to axis 21 by its two surfaces engaging the two surfaces 11 and 12 of standard 13. The intermediate member 8 cannot leave surfaces 11 and 12 and therefore cannot turn about an axis 22 at right angles to the axes 21 and 20. Member 8 can however turn elastically by a limited angle beta about axis 21 joining its fixing points, because its two surfaces engaging the surfaces 11 and 12 of standard 13 are of small diameter and will yield elastically if a corresponding torque is exerted on the intermediate member 8. These tilts may result e.g. from positional shifts of a supporting bearing 6 for the shaft 1 due to equalization of mechanical stress or thermal expansion within the standard 13.

If the supporting bearing 6, shown in FIG. 1, for some of the reasons just mentioned, shifts in a horizontal direction, the shaft 1 will follow with a corresponding tilt of typically 0.3 degrees within the intermediate member 8 through an angle marked alpha about an axis 23 which may be parallel with axis 22 better shown in FIG. 1. This title will be free of constraint too, because shaft 1 is guided by the guiding means 3 of the intermediate member 8 by the projections 4 and 5 in the vertical direction only. Because of this vertical guidance, shaft 1 cannot turn with respect to the intermediate member 8 about an axis 24 which may be parallel to axis 21.

Referring now to FIG. 9, a preferred arrangement of a shaft mounting as shown in FIGS. 1 and 2 in a theodolite would position the shaft 1 in the same general place as the corresponding shaft in the previously known devices. A disc 47 is attached to the end of the shaft 1 and provides a form of "divided circle" with angle markings on the outer or right face of the disc as viewed in FIG. 9. These markings extend radially and are spaced apart from one another circumferentially about the axis of the shaft 1.

A reader 48 for sensing the markings is carried by the intermediate member 8 of the shaft mounting through a substantially rigid carrier 49 fixed to the intermediate member 8 by screw means 50 at a location directly above the normal position of the axis of the shaft 1. Note in this connection that the attachment point provided by the screw 50 is on a diameter parallel to the diameter which intersects the shaft guiding projections 4 and 5 on the intermediate member 8 so that there is no substantial movement of the shaft 1 relative to the intermediate member in this direction. Note also that the tilting of the intermediate member 8 relative to the standard 13 has no effect on the relative positions of the markings on the disc 47 and the reader 48, because neither the markings nor the reader is fixed to the standard 13.

Figure 4:
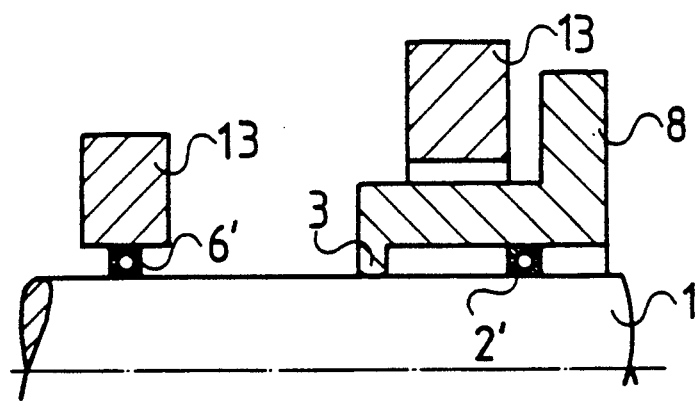
FIG. 4 is a cross section of a portion of the bearing as shown in FIG. 1 being equipped with rolling elements for bearing the shaft.

It will be appreciated by those of ordinary skill in the art that the present invention can be embodied in other specific forms without departing from the spirit or essential characteristics thereof. For example, the guiding means 2 and 3 of the main bearing and the supporting bearing 6 can also be equipped with rolling elements, e.g. ball bearings 2' and 6' as shown in FIG. 4. Furthermore, the sliding portions of the sliding bearings may have recesses and may exist only along given sectors.

Figure 5:
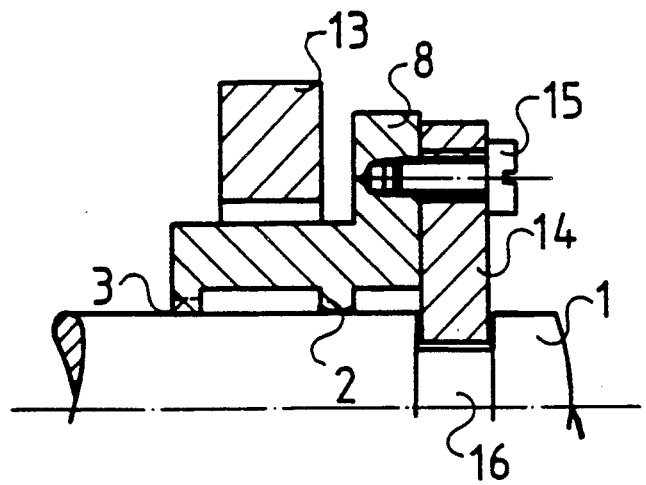
FIG. 5 is a cross section of a portion of the bearing as shown in FIG. 1 being equipped with guiding pieces for axially guiding the shaft.

Advantageously, the bearing for a shaft may be equipped with guiding pieces 14 fastened with screws 15 to the intermediate member 8, as shown in FIG. 5. The guiding pieces 14 engage a corresponding turned groove 16 of the shaft 1 to guide this shaft also in axial direction.

Figure 6:
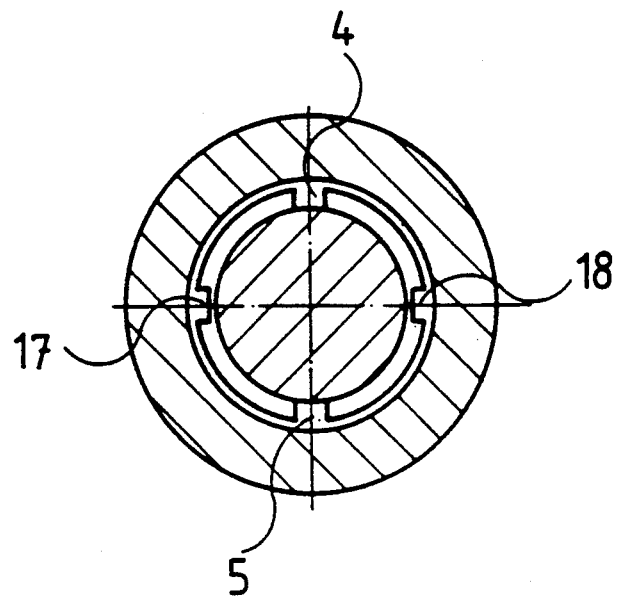
FIG. 6 is a cross section of a bearing as shown in FIG. 1 along a line marked C—C with a guiding means having two lateral limiting projections for the shaft.

Further, it may be necessary to limit the lateral tilt of the shaft 1 about the axis 23 by providing laterally limiting projections 17, 18 along with the projections 4, 5 of guiding means 3 as shown in FIG. 6. Projections 17, 18 are particularly useful to limit the tilt of the shaft 1 about the angle alpha to an admissible amount if shaft 1 is taken out of the supporting bearing 6.

Also, it should be noted that the mounting of the reader 48 on the intermediate member 8 of the mounting for the shaft makes it possible to provide an apparatus for bearing a shaft 1 in a standard 13, wherein the angle reading unit 46 can be preadjusted ready for mounting independently of its corresponding standard 13, the unit comprising already the shaft 1 and the bearing flange 49.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An apparatus for bearing a shaft in a standard comprising a main bearing and a supporting bearing, wherein the shaft is borne within the main bearing by means of an intermediate member having at least two guiding means for the shaft with an axial separation between said guiding means, the intermediate member is joined to the standard in such a way that it can be tilted with respect to the standard about a first axis at right angles to the axis of the shaft by an amount substantially greater than tilting of the intermediate member is possible about a second axis at right angles to said first axis and to the axis of the shaft, and wherein said two guiding means for the shaft are designed to allow the shaft to be tilted with respect to the intermediate member about a third axis extending in the same direction as said second axis by an amount substantially greater than tilting of the shaft is possible with respect to the intermediate member about a fourth axis extending in the same direction as said first axis.

2. An apparatus as claimed in claim 1, wherein the intermediate member is joined to the standard by means of fastening elements and by seat-engaging surfaces of sufficiently small extent which are provided diametrically on said first axis at right angles to the axis of the shaft.

3. An apparatus as claimed in claim 1, wherein the shaft is radially guided around its complete circumference within one of said two guiding means of said intermediate member, and the shaft is radially constrained within another of said two guiding means only in a direction parallel to said third axis by means of two first projections diametrically provided within said other guiding means.

4. An apparatus as claimed in claim 3, wherein said other guiding means has two second projections diametrically provided along said fourth axis and limiting the position of the shaft along said fourth axis to a maximum allowed range.

5. An apparatus as claimed in claim 3, wherein said one of said two guiding means of said intermediate member and said supporting bearing have rolling elements for bearing the shaft.

6. An apparatus as claimed in claim 1, wherein the shaft has a turned groove around its circumference and guiding pieces may be fastened to said intermediate member which engage the turned groove and which inhibit an axial shift of the shaft with respect to the intermediate member.

7. A theodolite having a base and an upper portion, the upper portion comprising a standard and a telescope borne in the standard by a shaft in a main bearing and a supporting bearing, the theodolite further comprising encoder means for measuring the horizontal direction and the elevation angle of said telescope, wherein said shaft of the telescope is borne in the standard by the apparatus as claimed in claim 1.

8. A theodolite comprising a base, an upper portion including a standard, a telescope, a substantially horizontal telescope shaft, means for mounting said shaft on said standard for rotary movement about its axis, and an encoder for measuring the elevation angle of said telescope, said means for mounting said shaft including an intermediate bearing member supported on said standard and supporting a portion of said shaft, said intermediate member being substantially fixed against horizontal tilting with respect to said standard but being capable of limited vertical tilting relative to said standard, said shaft being substantially fixed against vertical tilting with respect to said intermediate member but being capable of limited horizontal tilting relative to said intermediate member.

9. A theodolite as claimed in claim 8, wherein the encoder for measuring the elevation angle of the telescope includes a divided circle having angle indicia thereon and a reader for reading said indicia, said divided circle being attached to an end of said shaft, and said reader being attached to said intermediate bearing member at a location vertically above the axis of said shaft.

10. A pre-adjustable pre-assembled unit for use in a theodolite of the type having a base, a standard fixed to siad base and a telescope adjustably carried by said standard; said unit including a shaft adapted to be connected to and support said telescope; an intermediate bearing member for an end portion of said shaft adapted to be connected to said standard for limited tilting in a vertical direction but not in a horizontal direction, said intermediate bearing member having guide surfaces for contacting said shaft for supporting it against vertical tilting relative to said bearing member but permitting horizontal tilting thereof relative to said bearing member; and an encoder for measurement of the angular position of said shaft about its axis, said encoder including a divided circle carried by an end of said shaft and having indicia thereon, and a reader carried by said bearing member at a location vertically above said shaft for reading said indicia.

* * * * *